United States Patent
Suzuki et al.

(10) Patent No.: US 7,593,471 B2
(45) Date of Patent: Sep. 22, 2009

(54) FREQUENCY COMBINING APPARATUS AND FREQUENCY COMBINING METHOD

(75) Inventors: Mitsuhiro Suzuki, Chiba (JP); Sachio Iida, Chiba (JP)

(73) Assignee: Sony Corporation, Tokyo (JP)

( * ) Notice: Subject to any disclaimer, the term of this patent is extended or adjusted under 35 U.S.C. 154(b) by 571 days.

(21) Appl. No.: 10/575,082

(22) PCT Filed: Oct. 8, 2004

(86) PCT No.: PCT/JP2004/014922

§ 371 (c)(1),
(2), (4) Date: Apr. 7, 2006

(87) PCT Pub. No.: WO2005/039082

PCT Pub. Date: Apr. 28, 2005

(65) Prior Publication Data

US 2007/0071115 A1    Mar. 29, 2007

(30) Foreign Application Priority Data

Oct. 21, 2003    (JP)    ............................. 2003-360249

(51) Int. Cl.
*H04L 27/28* (2006.01)
(52) U.S. Cl. .................................................... 375/260
(58) Field of Classification Search ................ 375/259, 375/260
See application file for complete search history.

(56) References Cited

U.S. PATENT DOCUMENTS 5,019,785 A * 5/1991 Fognini et al. .............. 327/105

FOREIGN PATENT DOCUMENTS

| GB | 2 215 152 A | 9/1989 |
|---|---|---|
| JP | 63-84320 | 4/1988 |
| JP | 64-60021 | 3/1989 |
| JP | 2-166904 | 6/1990 |
| JP | 4-288708 | 10/1992 |
| JP | 10-041816 | 2/1998 |
| JP | 11-55036 | 2/1999 |
| JP | 11-234047 | 8/1999 |
| JP | 11-330962 | 11/1999 |

OTHER PUBLICATIONS

Derwent Abstract, Accession No. 2000-120493/11, JP 11352203 A, Dec. 24, 1999.

* cited by examiner

*Primary Examiner*—David B Lugo
(74) *Attorney, Agent, or Firm*—Oblon, Spivak, McClelland, Maier & Neustadt, P.C.

(57) ABSTRACT

A reference frequency of 4224 MHz is divided into ½ to obtain a sampling frequency of 2112 MHz, and further the frequency division into ½ is sequentially performed and the values of three bits outputted by the ½, ¼ and ⅛ frequency division are decoded in response to frequency selection. From one set of nonlinear 2-bit DA converters which output amplitudes {−1.7, −0.7, 0.7, 1.7} using these decoded values as input, complex amplitudes corresponding to eight phases in a complex plane are outputted, so that complex sine waves are generated. Using these complex sine waves, the frequency switching is performed. Center frequencies of respective bands can be obtained without a phase error or an amplitude error.

6 Claims, 8 Drawing Sheets

TRUTH TABLE OF DECODER

| 8divider | +264[MHz] | -264[MHz] | +792[MHz] | -792[MHz] |
|---|---|---|---|---|
| 000 | (11,10) | (11,01) | (10,11) | (10,00) |
| 001 | (10,11) | (10,00) | (00,01) | (00,10) |
| 010 | (01,11) | (01,00) | (11,01) | (11,10) |
| 011 | (00,10) | (00,01) | (01,11) | (01,00) |
| 100 | (00,01) | (00,10) | (01,00) | (01,11) |
| 101 | (01,00) | (01,11) | (11,10) | (11,01) |
| 110 | (10,00) | (10,11) | (00,10) | (00,01) |
| 111 | (11,01) | (11,10) | (10,00) | (10,11) |

$rot(f_1 t+\phi_1)$ $rot(f_2 t+\phi_2)$ $rot((f_1+f_2)t+\phi_1+\phi_2)$

FIG. 10

FREQUENCY COMBINING APPARATUS AND FREQUENCY COMBINING METHOD

TECHNICAL FIELD

The present invention relates to a frequency synthesizing apparatus and frequency synthesizing method for synthesizing two or more frequencies to obtain a new frequency and particularly, relates to a frequency synthesizing apparatus and frequency synthesizing method for obtaining center frequencies of respective bands in a multiband system composed of a plurality of bands.

More specifically, the present invention relates to a frequency synthesizing apparatus and frequency synthesizing method for obtaining center frequencies of respective bands by division of a reference frequency and frequency addition, and particularly, relates to a frequency synthesizing apparatus and frequency synthesizing method for obtaining center frequencies of respective bands without a phase error or amplitude error.

BACKGROUND ART

Wireless LAN has drawn attention as a system that liberates a user from LAN wiring of a wired system. According to the wireless LAN, since most wired cables can be eliminated in a work area such as an office, a communication terminal such as a personal computer (PC) may be moved without much difficulty. In recent years, the faster and less expensive the wireless LAN system becomes, the further the demand increases. Particularly, in recent, an introduction of a personal area network (PAN) is proposed for constructing a small-scaled wireless network among a plurality of electronic devices surrounding a person so as to perform information communications among these devices. For example, provisions are set for different wireless communication systems and wireless communication devices, which utilize frequency bands that do not require a license from a regulatory agency, such as a 2.4 GHz band and a 5 GHz band.

For example, in recent years, a system in which wireless communications are performed with information carried in a very weak impulse stream, called "Ultrawide Band (UWB) communication", has drawn attention as a wireless communication system that realizes a short-range ultra-fast transmission, and its practical application has been expected. At present, in IEEE 802.15.3 and the like, a data transmission system with a packet structure including a preamble as an access control system for ultrawide band communication is devised.

In the case where the wireless network is constructed in a work environment where many devices coexist indoors, it is assumed that a plurality of networks is constructed in an overlapped manner. In the wireless network using a single channel, even if another system interrupts during communication or even if communication quality is reduced due to interference or the like, there is no room for mending the situation. Therefore, a multichannel communication system in which a plurality of frequency channels are prepared to perform frequency hopping, thereby operating is considered. For example, when the communication quality is reduced due to interference or the like during communication, the network operation is maintained by frequency hopping, so that coexistence with other networks can be realized.

Furthermore, when the wireless network is constructed indoors a multipath environment in which a receiving apparatus receives the combination of a direct wave and a plurality of reflected waves/delayed waves is formed. Delay distortion (or frequency selective fading) is generated by the multipath, thereby causing an error in communication. Further, there occurs inter symbol interference attributed to the delay distortion.

As a main countermeasure against the delay distortion, a multicarrier transmission system can be exemplified. In the multicarrier transmission system, since transmission data is divided into a plurality of carriers with different frequencies, the band of each of the carriers becomes a narrow band, which makes it difficult to be affected by the frequency selective fading.

For example, in an OFDM (Orthogonal Frequency Division Multiplexing) system, which is one of the multicarrier transmission systems, frequencies of respective carriers are set so that the respective carriers are mutually orthogonal within a symbol block. At the time of information transmission, information sent serially is subjected to serial/parallel conversion every symbol period which is slower than an information transmission rate and a plurality of pieces of outputted data are assigned to the respective carriers to modulate the amplitude and the phase for each of the carriers, and inverse FFT is applied to the plurality of carriers, so that the carriers are converted into time-base signals while holding the orthogonality of the respective carriers on a frequency basis to be sent. Furthermore, at receiving time, a reverse operation is performed, that is, FFT is performed to convert the time-base signals into the frequency-base signals, demodulation of the respective carriers according to the respective modulation systems thereof is performed, and parallel/serial conversion is performed to reproduce the original information sent in a serial signal.

The OFDM modulation system is employed as a standard of wireless LAN, for example, in IEEE 802.11a/g. Also, in IEEE 802.15.3, in addition to a DS-UWB system in which diffusion speed of an information signal of DS is increased to the maximum, and an impulse-UWB system in which an information signal is composed using an impulse signal stream with a very short period of about several 100 picoseconds to be transmitted and received, standardization of an UWB communication system employing the OFDM modulation system has been developed. In the case of the OFDM_UWB communication system, there has been considered OFDM modulation using IFFT/FFT, in which frequency hopping (FH) every a plurality of subbands each having a 528 MHz width is applied to frequency bands of 3.1 to 4.8 GHz, and the frequency bands are composed of 128 points (for example, refer to Non-Patent Document 1).

Figure 7:
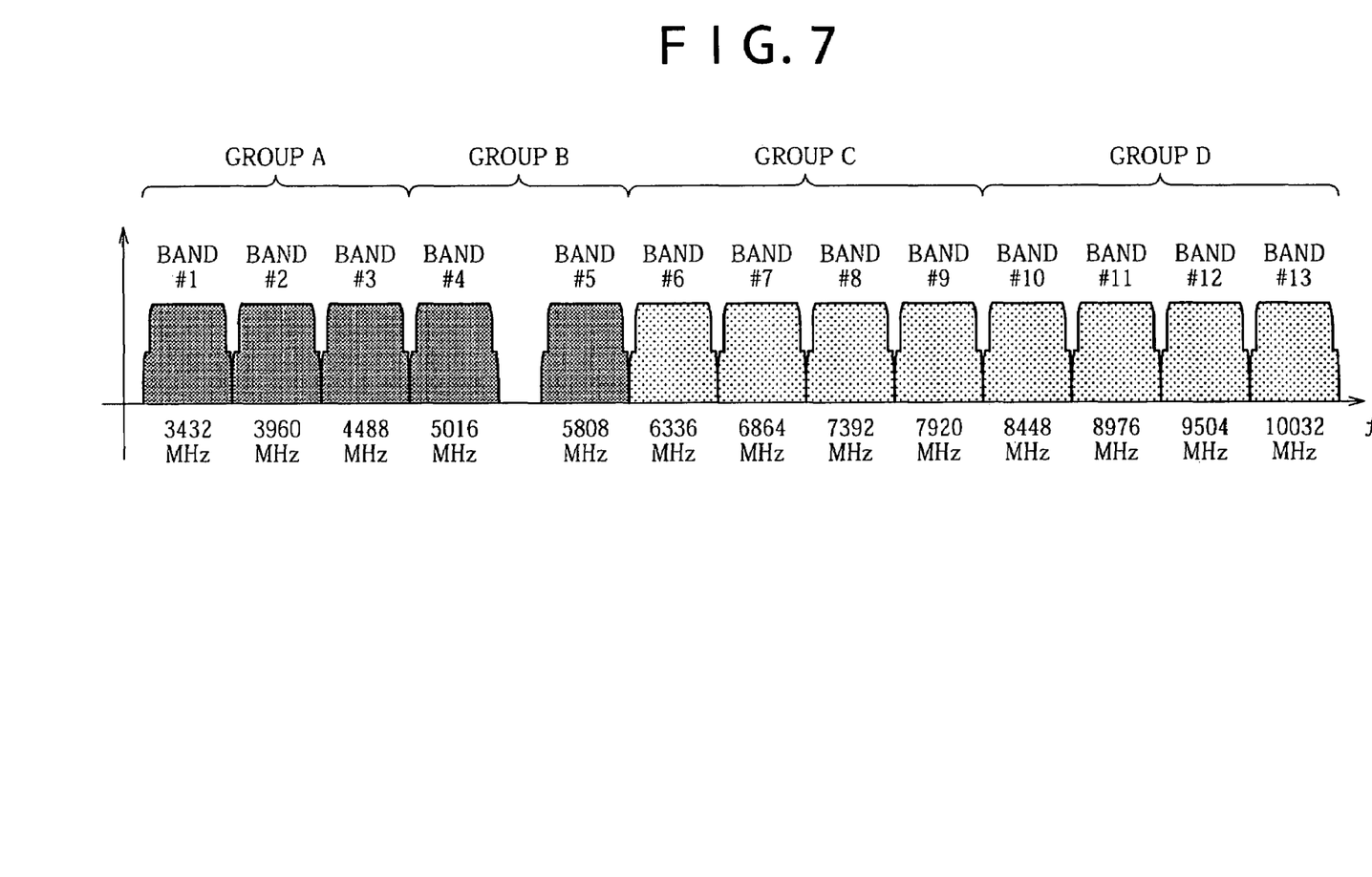
FIG. 7 is a diagram showing frequency assignment defined in a multiband OFDM_UWB communication system.

In FIG. 7, frequency assignment defined in the multiband OFDM_UWB communication system is shown. As shown the same figure, the assignment is such that a group A is composed of bands #1 to 3 having center frequencies of 3432 MHz, 3960 MHz, and 4488 MHz, respectively, a group B is composed of a band #4 and a band # 5 having center frequencies of 5016 MHz and 5808 MHz, respectively, a group c is composed of bands #& to # 9 having center frequencies of 6336 MHz, 6864 MHz, 7392 MHz and 7920 MH, respectively, and a group D is composed of groups #10 to #13 having center frequencies of 8448 MHz, 8976 MHz, 9504 MHz and 10032 MHz.

In the multiband OFDM_UWB system, the center frequencies corresponding to these respective bands need to be synthesized. Among them, the use of three bands of the group A is mandatory and the use of seven bands of the group A and the group C is defined as an option. The other groups and the bands are prepared for extension in future.

Although for frequency switching, it is generally considered to multiply the same oscillation frequency by a PLL (phase Lock Loop), the multiband OFDM_UWB system has a problem that the switching width of the channel as shown in FIG. 7 is large and the frequency switching in such a wide band cannot be performed by a single PLL.

Furthermore, by providing a plurality of oscillators so that each of them generates a frequency band, a high precision multiband generator can be constructed. However, there is a problem with circuit area and power consumption. Accordingly, there is technical demand for making a plurality of frequency bands from a single oscillator by frequency division.

For example, by repeating the frequency division of a single frequency outputted from an oscillator, mixing is applied to the respective frequency division outputs (that is, either of a sum and a difference of the frequencies is outputted) to thereby perform multiband generation.

Figure 8:
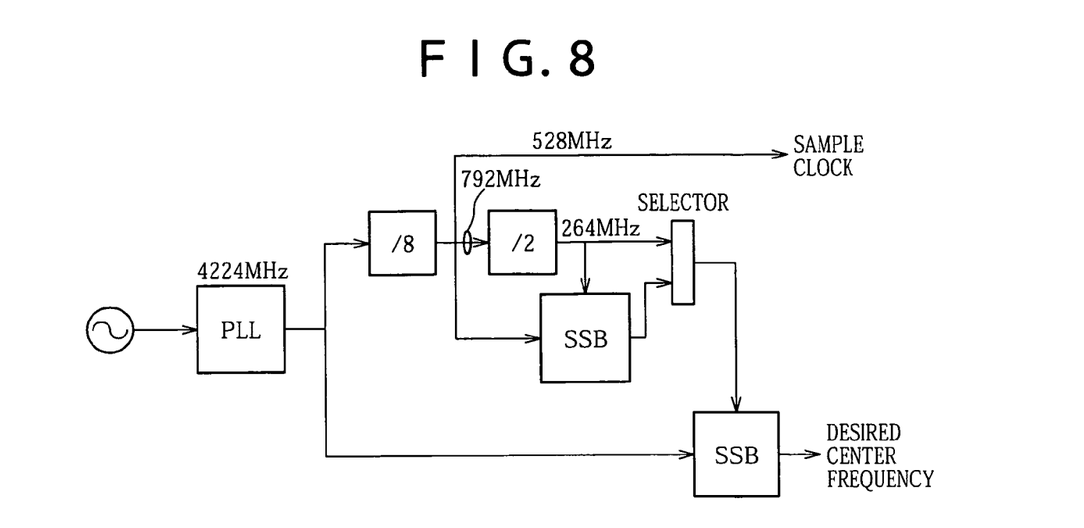
FIG. 8 is a diagram showing a frequency synthesizing block (conventional example) for hopping used in a multiband OFDM system.

In FIG. 8, a conventional example of a frequency synthesizing block for hopping (which is 3-band mode of the group A) used in the multiband OFDM system is illustrated (for example, refer to Non-Patent Document 1). The center frequency of each band can be synthesized (frequency addition/subtraction), using frequency division of a reference frequency obtained from a single oscillator (for example, TCXO) and mixers, as shown in the figure.

In the example shown in the same figure, a frequency 4224 MHz obtained by multiplying an oscillation frequency outputted by the oscillator by a PLL is a reference frequency. First, a frequency of 528 MHz is taken out by ⅛ frequency division and a frequency of 264 MHz is taken out by ½ frequency division. Furthermore, the frequency of 528 MHz necessary as a sample clock can be synthesized by frequency division.

Subsequently, in each mixer indicated by SSB (Single Side Band), frequency addition is performed using 528 MHz and 264 MHz, resulting in a frequency of 794 MHz. In addition, one of 264 MHz and 794 MHz is selected by a selector (Select), and a frequency of 3960 MHz can be obtained as a desired center frequency by frequency subtraction of 4224 MHz and 264 MHz in the SSB at a latter state and a frequency of 4488 MHz can be obtained by frequency addition of 4224 MHz and 264 MHz. Further, a frequency of 3422 MHz can be obtained by subtracting 792 MHz from 4224 MHz.

Figure 9:
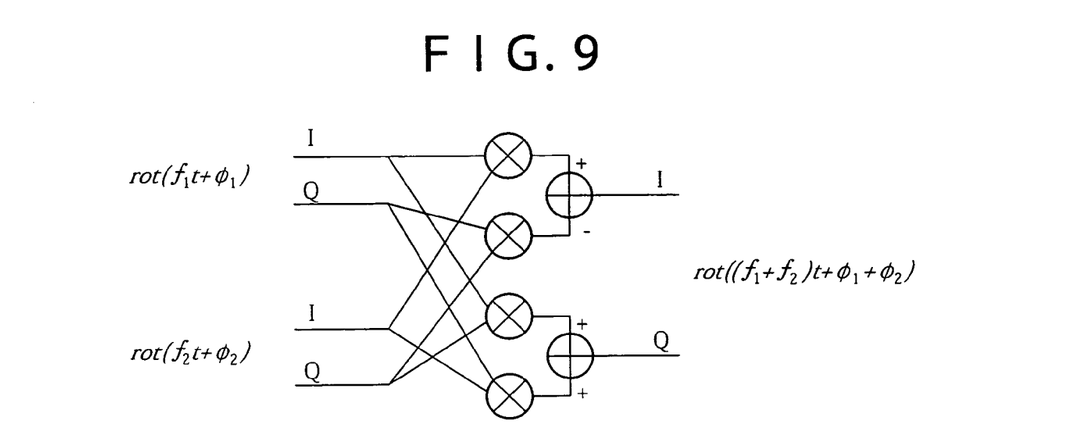
FIG. 9 is a diagram showing a configuration of a frequency adder.

In each of the mixers indicated by SSB in FIG. 8, orthogonal components with respect to each other are prepared in each signal and frequency synthesis can be performed by addition and subtraction of the frequencies using the addition theorem of the trigonometric function as shown in the below-described equation. In FIG. 9, a configuration of a frequency adder is shown. Here, a function rot(x) is defined as rot(x) =exp(2πjx).

Figure 10:
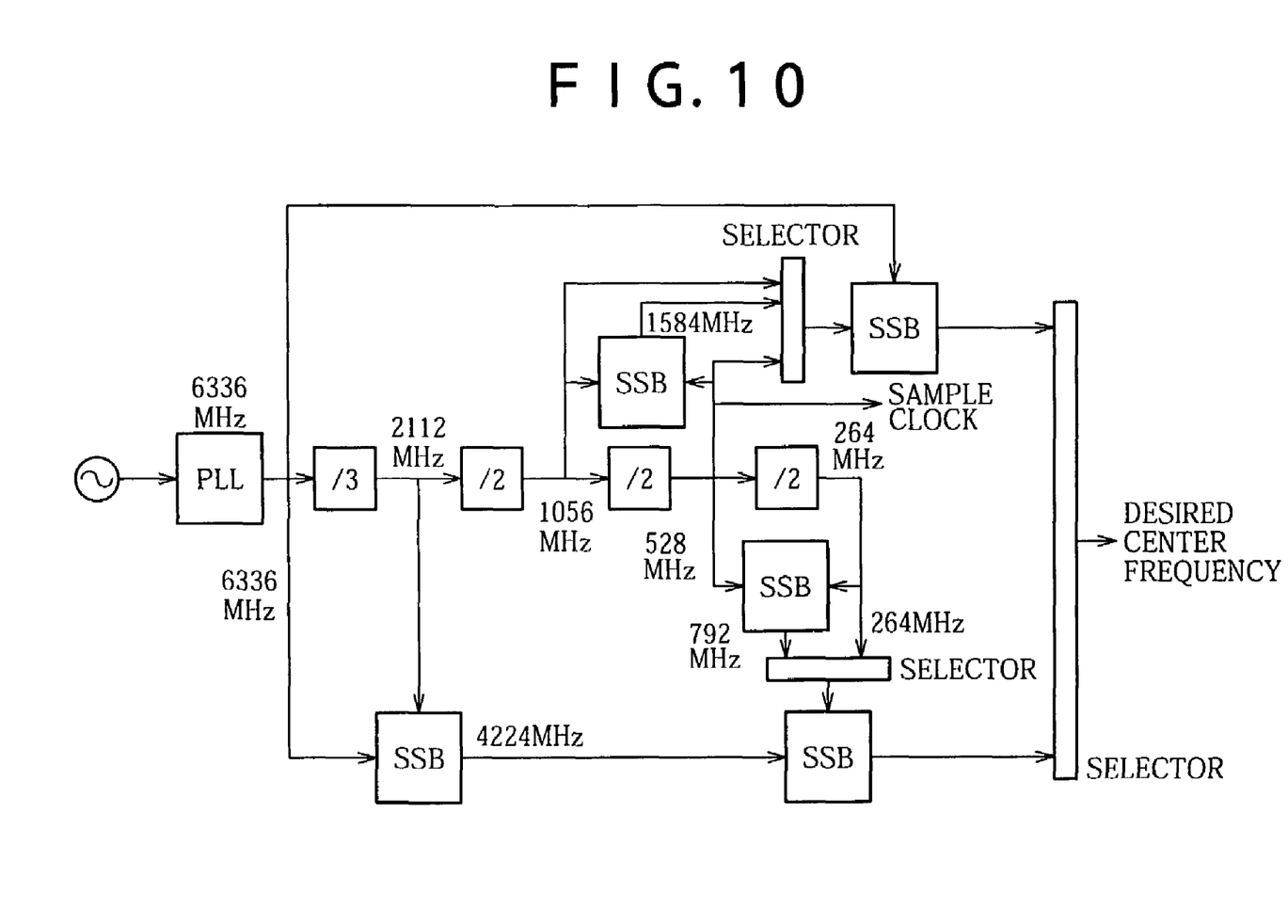
FIG. 10 is a diagram showing a frequency synthesizing block (conventional example) used in a 7-band mode constructed from the group A and the group C.

Furthermore, in FIG. 10, a conventional example of a frequency synthesizing block used in 7-band mode composed of the group A and the group C is illustrated. Center frequencies of respective bands, as shown in the figure, can be synthesized (frequency addition/subtraction) using frequency division of a reference frequency obtained from a single oscillator (for example, TCXO) and mixers.

In the example of the same figure, a frequency 6336 MHz obtained by multiplying an oscillation frequency outputted from the oscillator by a PLL is a reference frequency. First, a frequency of 2112 MHz is taken out by ⅓ frequency division and then, a frequency of 1056 MHz is taken out by ½ frequency division. Furthermore, frequencies of 528 MHz and 264 MHz are taken out by repeating ½ frequency division twice. In addition, the frequency of 528 MHz necessary as a sample clock can be synthesized by frequency division.

Moreover, in the example of the same figure, five SSB blocks that performs frequency addition/subtraction are mounted. In a first SSB, a frequency of 4224 MHz is obtained by frequency subtraction of 6336 MHz and 2112 MHz. In a second SSB, a frequency of 1584 MHz is obtained by frequency addition of 1056 MHz and 528 MHz. Further, in a third SSB, frequency addition/subtraction of any one of 1056 MHz, 1584 MHz and 528 MHz, which is selected by a selector, and 6336 MHz is performed. In a fourth SSB, a frequency of 792 MHz is obtained by frequency addition of 528 MHz and 264 MHz. Furthermore, in a fifth SSB, the 4224 MHz obtained by the first SSB is subjected to frequency addition/subtraction of either 792 MHz or 264 MHz, which is selected by the selector. Finally, the frequency addition/subtraction result of the third SSB or the fourth SSB is selectively outputted, and consequently, the center frequencies of seven bends composed of the group A and the group C can be obtained.

(Non-Patent Document 1)

IEEE 802.15.3a TI Document <URL:http://grouper. ieee.org/groups/802/15/pub/2003/May03, file name: 03142r2P802-15 TI-CFP-Document.doc>

DISCLOSURE OF THE INVENTION

However, in the conventional frequency synthesizing blocks as shown in FIGS. 8 and 10, there are shortcomings as described below.

(1) Since the addition theorem of the trigonometric function is used in the SSBs (refer to FIG. 9), orthogonal components (sin components for cosine) need to be obtained for 528 MHz and 264 MHz, which becomes a cause of a phase error.

(2) Since the addition theorem of the trigonometric function is used in the SSBs, complicated operations such as multiplication and addition need to be performed, which becomes a cause of a phase error or an amplitude error.

(3) The selector (Select) is made of an analogue switch, which becomes a cause of a phase error and an increase of a circuit size.

(4) Particularly in the example shown in FIG. 10, the number of the SSB blocks is large and thus, sizes of the operation circuits for complicated operations such as the multiplication and addition become larger, thereby increasing power consumption.

For example, in order to improve a resolution of ranging measurement as an application example of the UWB technology, it is important to measure a transmission-path characteristic in a multi-path environment at fine intervals of time in a band as wide as possible and measure an arriving time τ of a received signal more precisely (which is equivalent to a fine pulse width). For example, if the ranging measurement can be performed in one nanosecond unit, the ranging measurement at a resolution of about 30 cm is achieved.

On the other hand, in the wireless communication system of the multiband, the transmission-path characteristic can be estimated for each band. Here, the transmission-path estimate values of the respective bands are linked together so as to be considered as a continuous frequency characteristic, enabling a wideband transmission-path characteristic estimation. However, if there is a phase difference between subbands, the frequency characteristic becomes discontinous, and thus the transmission-path characteristic estimate values in the respective subbands cannot be integrated to be a wideband transmission-path characteristic estimate value.

An object of the present invention is to provide an excellent frequency synthesizing apparatus and frequency synthesizing method in which center frequencies of respective bands in a multiband system composed of a plurality of bands can be suitably obtained.

A further object of the present invention is to provide an excellent frequency synthesizing apparatus and frequency synthesizing method in which center frequencies of respective bands can be suitably obtained by division of a reference frequency and frequency addition.

A further object of the present invention is to provide an excellent frequency synthesizing apparatus and frequency synthesizing method in which center frequencies of respective bands can be obtained without a phase error or an amplitude error. Particularly, there are provided an excellent frequency synthesizing apparatus and frequency synthesizing method effective in a multiband system with a large switching width of center frequencies of respective bands.

A further object of the present invention is to provide an excellent frequency synthesizing apparatus and frequency synthesizing method in which center frequencies of respective bands can be obtained with a relatively small circuit size and low consumption power. Particularly, there are provided an excellent frequency synthesizing apparatus and frequency synthesizing method effective in estimation of continuous wideband transmission-path characteristic over a plurality of subbands, which are disclosed in Japanese Patent Application No. 2003-294942 assigned to the present applicant.

The present invention is achieved in light of the shortcomings, and there is provided a frequency synthesizing apparatus that synthesizes a plurality of frequencies based on a reference frequency, characterized by comprising:

complex sine wave generating means for generating complex sine waves by outputting complex amplitudes corresponding to eight phases in a complex plane; and frequency switching means for performing frequency switching by performing complex number multiplication of the complex sine waves and the reference frequency.

Here, the complex sine wave generating means is constructed from two nonlinear DA converters having amplitudes {−1.7, −0.7, 0.7, 1.7}. More specifically, 0.7 is sqrt (0.5), that is, a square root of 0.5.

Three bits outputted by the ½, ¼ and ⅛ frequency division of the sampling frequency of the nonlinear DA converter are decoded, and input data to the DA converter is determined. When the ¼ and ⅛ frequency division are performed, the decoding is performed with using frequency outputs having a phase difference of 90 deg from each other.

In the case where center frequencies of three bands forming a group A in an OFDM_UWB system are generated, the frequency synthesizing apparatus according to the present invention is constructed by using an oscillator that oscillates a frequency of 4224 MHz as a reference, a frequency divider that divides the reference frequency into ½ to obtain 2112 MHz as a sampling frequency, three frequency dividers that further divide the sampling frequency into ½ sequentially, a decoder that decodes values of three bits outputted from these frequency dividers with the ½, ¼ and ⅛ frequency division in response to frequency selection, and one set of nonlinear 2-bit DA converters that output amplitudes of {−1.7, −0.7, 0.7, 1.7} using the decoded values by the decoder as input.

The complex amplitudes corresponding to eight phases in the complex plane are outputted from the two sets of nonlinear DA converters, so that the complex sine waves can be generated. Accordingly, +264 MHz is outputted by incrementing +1 phase in a positive direction of phase. Further, −264 MHz is outputted by incrementing −1 phase in the positive direction of phase. Furthermore, +792 MHz is outputted by incrementing +3 phases in the positive direction of phase. Moreover, −792 MHz is outputted by incrementing −3 phases in the positive direction of phase.

Furthermore, by performing frequency addition (complex number multiplication) with these outputs of the nonlinear DA converters and the reference frequency of 4224 MHz, 4488 MHz (=4224+264), 3960 MHz (=4224−264) and 3432 MHz (=4224−792) which are respective center frequencies of the three bands forming the group A of the multiband OFDM_UWB system can be obtained without a phase error or an amplitude error.

In the case where in addition to the three bands forming the group A in the OFDM_UWB, center frequencies of four bands forming a group C are further generated, an oscillator that oscillates at a frequency of 7128 MHz is further included in addition to the reference of 4224 MHz. Furthermore, by selectively performing complex number multiplication of either reference frequency of 4224 MHz or 7128 MHz and the respective outputted frequencies of the complex sine wave generating means, the frequency switching means obtains the respective center frequencies 4488 MHz, 3960 MHz and 3432 MHz of the three bands that forms the group A of the multiband OFDM_UWB system, and can further obtain respective center frequencies 7920 MHz (=7128+792), 7392 MHz (7128+264), 6864 MHz (7128−264) and 6336 MHz (=7128−792), which form the group C.

Namely, according to the configuration of the frequency synthesizing apparatus according to the present invention, since completely the same circuit is used for all the respective center frequencies 4488 MHz, 3960 MHz and 3432 MHz forming the group A of the multiband OFDM_UWB system, no error such as phase difference and amplitude difference from each other occurs. Furthermore, since only one circuit for frequency addition, which has a large size for a circuit, is used, a reduction in circuit size and low power consumption can be realized.

According to the present invention, there can be provided an excellent frequency synthesizing apparatus and frequency synthesizing method in which center frequencies of respective bands in a multiband system constructed from a plurality of wide bands can be suitably obtained.

Furthermore, according to the present invention, there can be provided an excellent frequency synthesizing apparatus and frequency synthesizing method in which center frequencies of respective bands can be suitably obtained by division of a reference frequency and frequency addition.

Furthermore, according to the present invention, there can be provided an excellent frequency synthesizing apparatus and frequency synthesizing method in which center frequencies of respective bands can be obtained without a phase error or an amplitude error.

Furthermore, according to the present invention, there can be provided an excellent frequency synthesizing apparatus and frequency synthesizing method in which center frequencies of respective bands can be obtained with a relatively small circuit size and low power consumption. Since the frequency synthesizing apparatus according to the present invention can synthesize the multiband using only one circuit for frequency addition, which requires a large circuit size, a reduction in circuit size and low power consumption can be realized.

Still other objects, characteristics and advantages will be apparent by further detailed description based on embodiments of the present invention described later and accompanying drawings.

BEST MODE FOR CARRYING OUT THE INVENTION

Hereinafter, embodiments of the present invention are described in detail, referring to the drawings.

Figure 1:
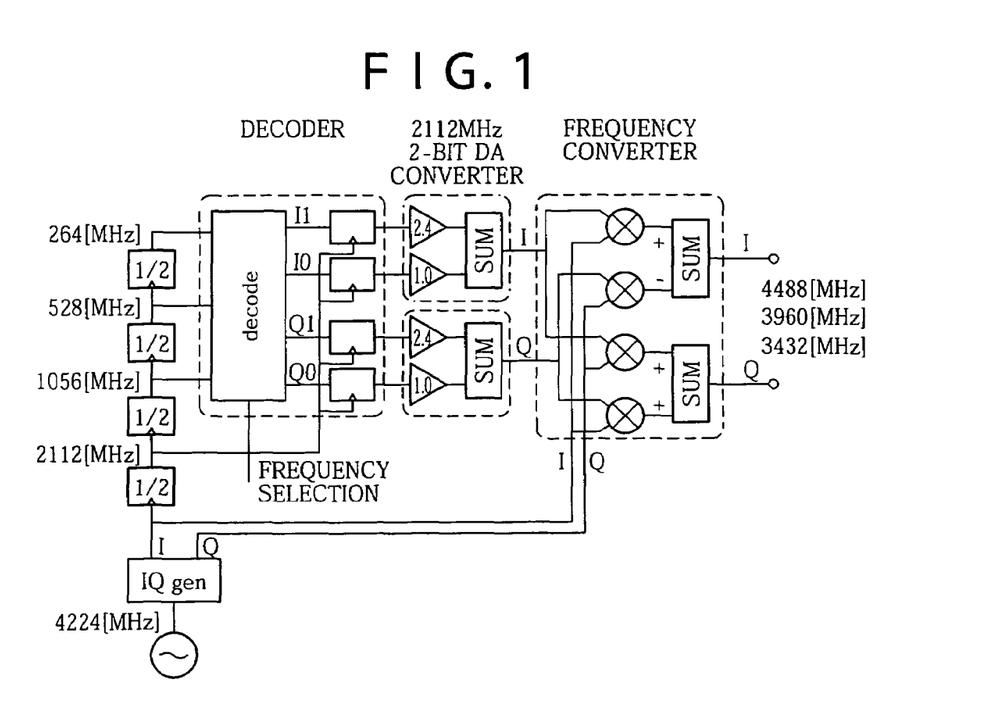
FIG. 1 is a diagram schematically showing a configuration of a frequency synthesizing apparatus according to one embodiment of the present invention.

In FIG. 1, a configuration of a frequency synthesizing apparatus according to one embodiment of the present invention is schematically shown. The frequency synthesizing apparatus as shown in the figure is applicable to, for example, a multiband OFDM_UWB communication system, in which respective center frequencies of three bands forming the group A can be suitably obtained by division of a reference frequency and frequency addition.

As shown in the figure, the frequency synthesizing apparatus includes an oscillator that oscillates a frequency of 4224 MHz as a reference, a frequency divider that divides the reference frequency into ½ to obtain 2112 MHz as a sampling frequency, three frequency dividers that further divide the sampling frequency into ½ sequentially, a decoder that decodes values of three bits outputted from these frequency dividers by ½, ¼ and ⅛ frequency division in response to frequency selection, and one set of nonlinear 2-bit DA converters that output amplitudes of {−1.7, −0.7, 0.7, 1.7} using the decoded values by the decoder as input. Here, more specifically, 0.7 is a sqrt(0.5), that is, a square root of 0.5. Complex amplitudes corresponding to eight phases in a complex plane are outputted from these two sets of nonlinear DA converters, so that complex sine waves can be generated. Furthermore, in a frequency converter, frequency switching is performed using these complex sine waves.

First, a reference of 422 MHz is outputted from the oscillator such as a TCXO (temperature-compensated crystal oscillator) and at the same time, respective signals of an I axis and a Q axis which have a relation of 90 deg with respect to each other are taken out.

For the I-axis signal of the reference frequency, ½ frequency division is repeated sequentially to thereby obtain frequencies of 2112 MHz, 1056 MHz, 528 MHz and 264 MHz.

Figure 2:
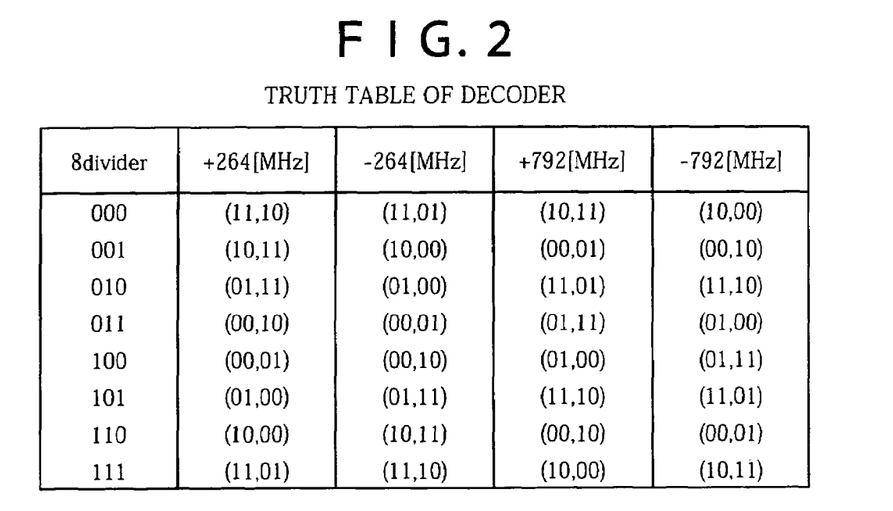
FIG. 2 is a diagram showing a truth table of a decoder.

Next, in the decoder, the decoding is performed from three bits outputted in ½, ¼, ⅛ frequency division of the sampling frequency of the nonlinear DA converters, that is, 1056 MHz, 528 MHz and 264 MHz. In FIG. 2, a truth table of the decoder is shown.

Figure 3:
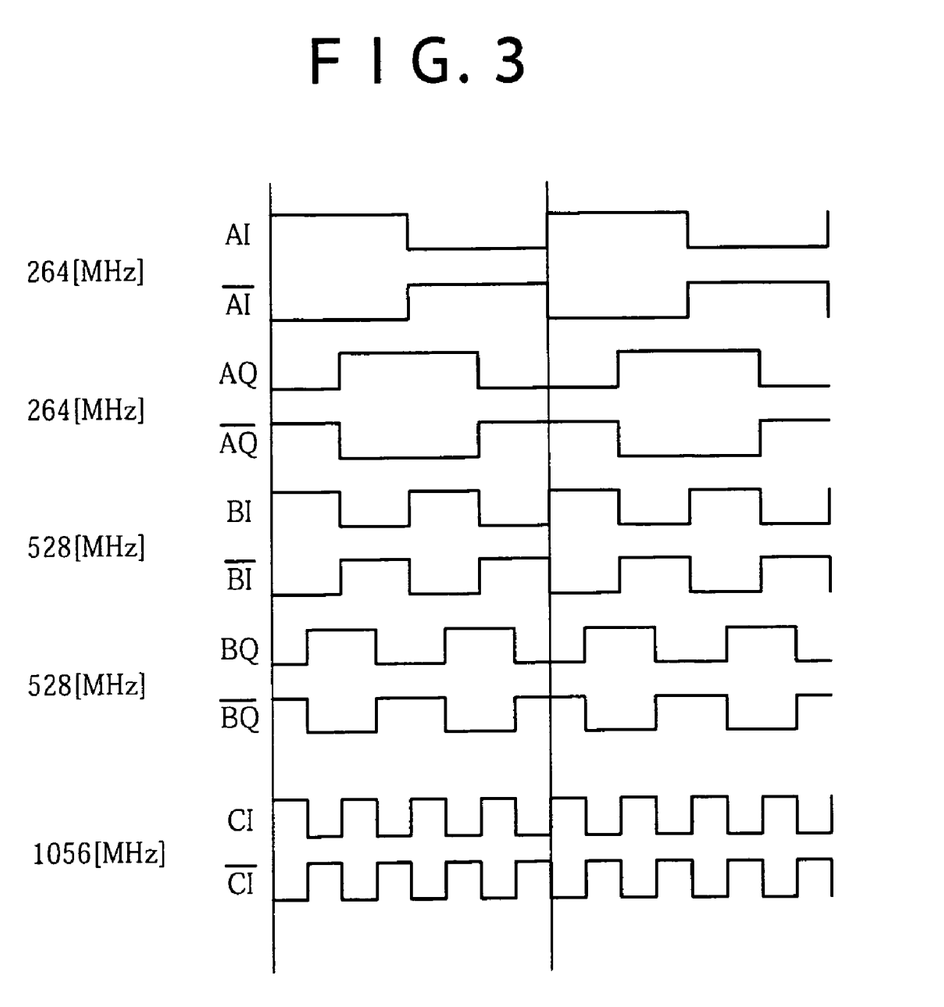
FIG. 3 is a timing flowchart of frequency division outputs.

For the I-axis signal of the reference frequency, ½ frequency division is repeated sequentially to obtain the frequencies 2112 MHz, 1056 MHz, 528 MHz and 264 MHz. In FIG. 3, a timing chart of the frequency division outputs is shown. When 264 MHz, 528 MHz and 1056 MHz are obtained, at the same time, the frequency division outputs having a relation of 90 deg with respect to each other (AQ for AI, BQ for BI, and CQ for CI) are obtained. The three bits in the leftmost column in the truth table shown in FIG. 2 consist of turnover values of AI, BI and CI.

Figure 4:
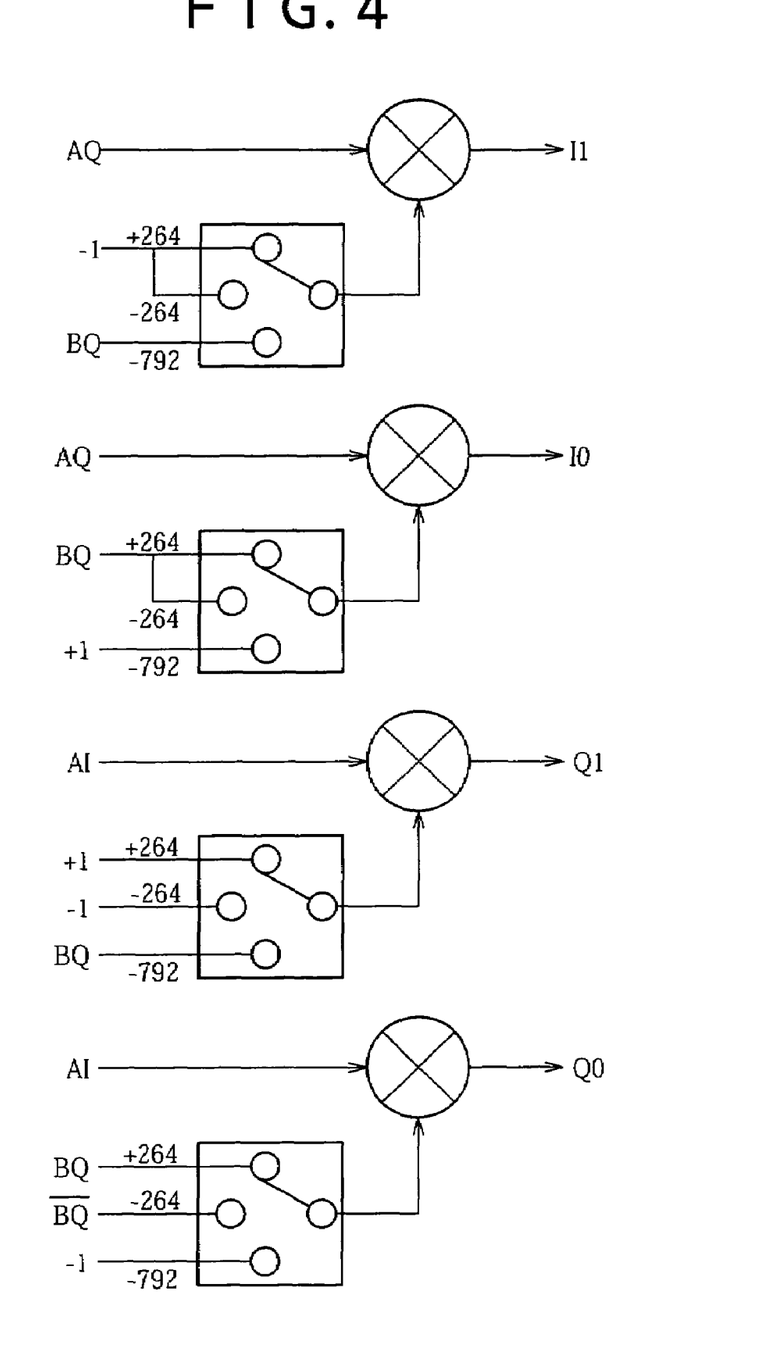
FIG. 4 is circuit diagrams in each of which the decoder is simplified based on the truth table shown in FIG. 2.

Here, using AQ for AI, and BQ for BI, simplification of the truth table shown in FIG. 2 is performed, so that the decoder can be simplified as shown in FIG. 4. However, in the same figure, a multiplier can be replaced by an exclusive OR (XOR) circuit.

Next, in the two nonlinear DA converters, the amplitudes {−1.7, −0.7, 0.7, 1.7} are obtained for the inputs of: {00, 01, 10, 11} using the decoded numeric values, respectively. More specifically, the level of the output 01 from the decoder is converted into ±0.5 by DC component offset. Furthermore, in each of the nonlinear DA converters, I1 and I0, Q1 and Q0 which are outputted from the decoder are amplified into 2.4 times and 1.0 time, respectively and the results are summed up to output complex amplitudes of a set of the I axis and the Q axis each having amplitudes {−1.7, −0.7, 0.7, 1.7} of at the timing of 2112 MHz. Here, 0.7 is, more specifically, sqrt(0.5), that is, a square root of 0.5.

Figure 5:
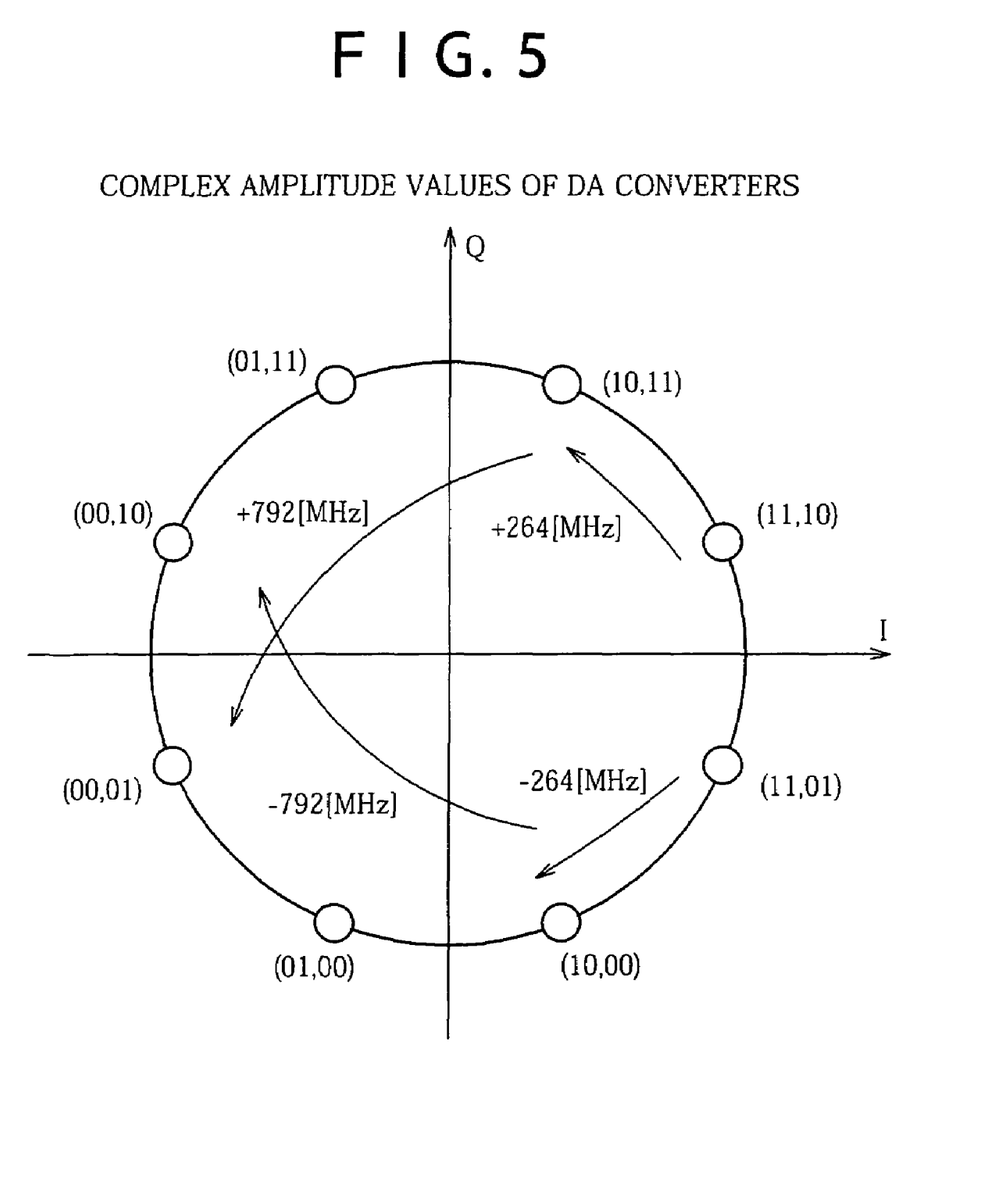
FIG. 5 is a diagram showing mapping of complex amplitudes of two sets of nonlinear DA converters on a circumference.

In FIG. 5, the complex amplitudes of the two sets of nonlinear DA converters are mapped on a circumference. As shown in the same figure, the outputs from the nonlinear DA converters having the amplitudes of {−1.7, −0.7, 0.7, 1.7} are mapped on eight points on a circumference.

The outputs of the two nonlinear DA converters are mapped at eight points in the complex plane as one set of the I axis and the Q axis, which means that the complex amplitudes corresponding to eight phases in the complex plane are outputted to thereby generate the complex sine waves. For example, if the output of the decoder is (11, 10), the output of the nonlinear DA converter is mapped at a point ((2.4×0.5+1×0.5), (2.4×0.5−0.5))=(1.7, 0.7) in the complex plane. If the output of the decoder is (10, 11), the output of the nonlinear DA converter is mapped at a point ((2.4×0.5−0.5), (2.4×0.5+1×0.5))=(0.7, 1.7) in the complex plane. If the output of the decoder is (01, 11), the output of the nonlinear DA converter is mapped at a point ((2.4×(−0.5)+0.5), (2.4×0.5+1×0.5))=(−0.7, 1.7) in the complex plane. If the output of the decoder is (00, 10), the output of the nonlinear DA converter is mapped at a point ((2.4×(−0.5)−0.5), (2.4×0.5−0.5))=(−1.7, 0.7) in the complex plane. If the output of the decoder is (00, 01), the output of the nonlinear DA converter is mapped at a point ((2.4×(−0.5)−0.5), (2.4×(−0.5)+1×0.5))=(−1.7, −0.7) in the complex plane. If the output of the decoder is (01, 00), the output of the nonlinear DA converter is mapped at a point ((2.4×(−0.5)+0.5), (2.4×(−0.5)+1×(−0.5))=(−0.7, −1.7) in the complex plane. If the output of the decoder is (10, 00), the output of the nonlinear DA converter is mapped at a point ((2.4×0.5−0.5, (2.4×(−0.5)+1×(−0.5))=(0.7, −1.7) in the complex plane. If the output of the decoder is (11, 01), the output of the nonlinear DA converter is mapped at a point ((2.4×0.5+1×0.5), (2.4×(−0.5)+0.5))=(1.7, −0.7) in the complex plane.

Accordingly, as seen from FIG. 5, +264 MHz is outputted by incrementing +1 phase in a positive direction of phase. Further, −264 MHz is outputted by incrementing −1 phase in a positive direction of phase. Furthermore, +792 MHz is outputted by incrementing +3 phases in a positive direction of phase. Moreover, −792 MHz is outputted by incrementing −3 phases in a positive direction of phase.

In the frequency converter (Frequency convert), such outputs of the nonlinear DA converters and the reference frequency of 4224 MHz are subjected to frequency addition (complex number multiplication), so that respective center frequencies 4488 (=4224+264), 3960 MHz (4224−264) and 3432 MHz (=4224−792) of the three bands forming the group A of the multiband OFDM_UWB system, can be obtained without a phase error or an amplitude error.

Figure 6:
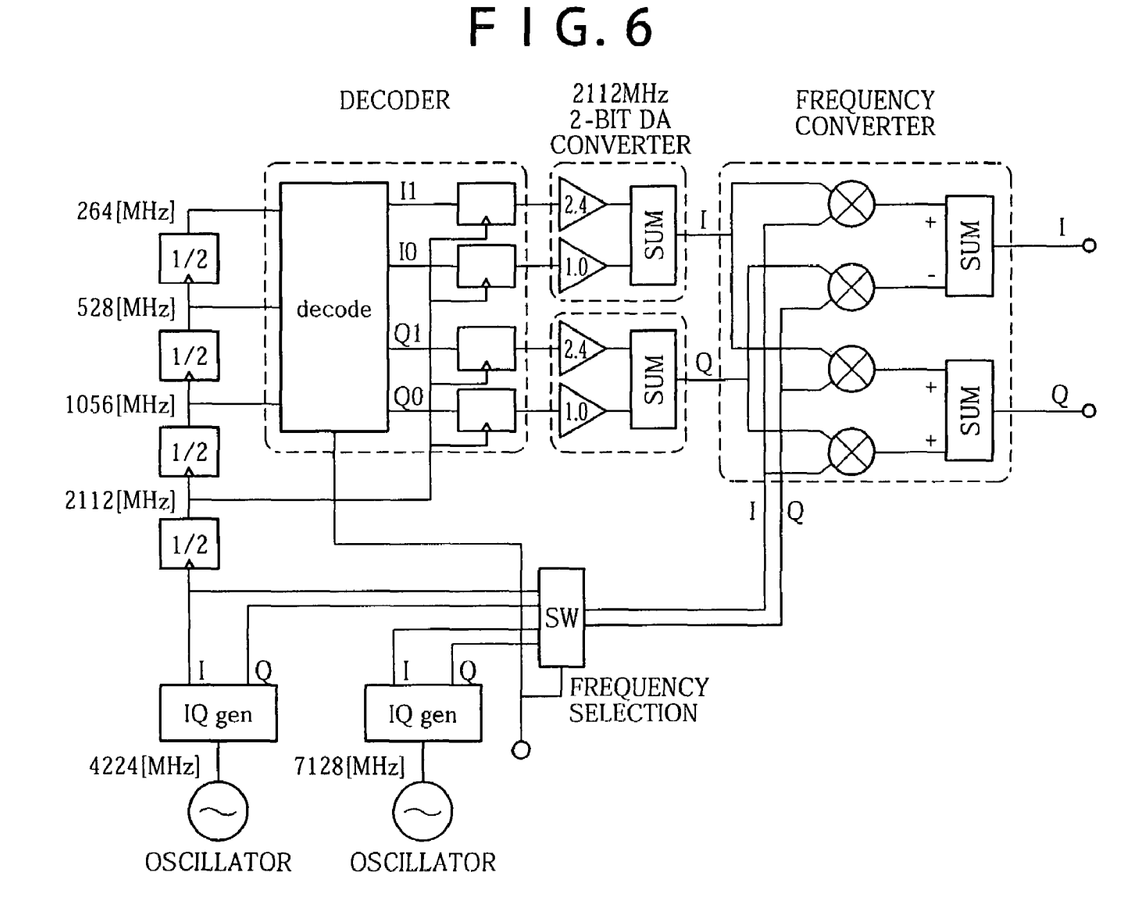
FIG. 6 is a diagram schematically showing a configuration of a frequency synthesizing apparatus according to another embodiment of the present invention.

Furthermore, in FIG. 6, a configuration of a frequency synthesizing apparatus according to another embodiment of the present invention is schematically shown. In the frequency synthesizing apparatus as shown in the figure is applied to, for example, a multiband OFDM_UWB communication system, in which by division of a reference frequency and frequency addition, respective center frequencies of the group A and four bands in total forming the group C can be obtained.

In the frequency synthesizing apparatus shown in FIG. 6, in contrast to the frequency synthesizing apparatus that generates the center frequencies of the three bands of the group A as shown in FIG. 1, a circuit module that generates the center frequencies of the four bands for the group C is further added.

In the example shown in the figure, in addition to the oscillator that oscillates the frequency of 4224 MHz as a reference, an oscillator that oscillates a frequency of 7128 MHz is provided, and in response to which mode of the group A of the group C is set, the oscillators are selectively switched to supply to the frequency converter (Frequency convert).

The decoder and the nonlinear DA converters have almost the same configurations as shown in FIG. 1. Namely, the nonlinear DA converters output the complex amplitudes corresponding to eight phases in the complex plane to thereby generate complex sine waves.

Furthermore, in the frequency converter (Frequency convert), by selectively performed frequency addition (complex number multiplication) of the outputs of these DA converters and 4224 MHz or 7128 MHz as the reference frequency, the respective center frequencies of the three bands forming the group A of the multiband OFDM_UWB system, 4488 MHz (=4224+264), 3960 MHz (=4224−264) and 3432 MHz (=4224−792), or the respective center frequencies of the four bands forming the group C thereof, 7920 MHz (=7128+792), 7392 MHz (=7128+264), 6864 MHz (=7128−264) and 6336 MHz (=7128−792) can be selectively obtained without a phase error and an amplitude error.

According to the configurations of the frequency synthesizing apparatuses as shown in FIGS. 1 and 6, since completely the same circuit is used for all the respective center frequencies 4488 MHz, 3960 MHz and 3432 MHz forming the group A of the multiband OFDM_UWB system, no error such as phase difference and amplitude difference from each other occurs. Furthermore, since only one circuit for frequency addition, which is large as a circuit, is used, a reduction in circuit size and low power consumption can be realized.

(Addendum)

As described above, the present invention has been described in detail, referring to the specific embodiments. However, it is obvious that those in the art can make modifications to, and substitutions for, the embodiments in the range not departing from the gist of the invention. Namely, the present invention is disclosed in a form of exemplification, and the described contents of the present specification should not be construed limitedly. In order to judge the gist of the present invention, claims described below should be considered.

The invention claimed is:

1. A frequency synthesizing apparatus that synthesizes a plurality of frequencies based on a reference frequency, comprising:
    complex sine wave generating means for generating complex sine waves by outputting complex amplitudes corresponding to eight phases in a complex plane; and
    frequency switching means for performing frequency switching by performing complex number multiplication of the complex sine waves and the reference frequency, wherein
    the complex sine wave generating means is constructed from two nonlinear DA converter shaving amplitudes {−1.7, −0.7, 0.7, 1.7}.

2. The frequency synthesizing apparatus according to claim 1, further comprising:
    frequency division means for sequentially dividing a sampling frequency of the nonlinear DA converter into ½; and
    a decoder that decodes three bits outputted by ½, ¼ and ⅛ frequency division of the sampling frequency and generates input data for the nonlinear DA converter.

3. The frequency synthesizing apparatus according to claim 2, wherein the decoder performs the decoding using frequency division outputs having a phase difference of 90° from each other if ¼ and ⅛ frequency division is performed.

4. The frequency synthesizing apparatus according to claim 2, wherein the reference frequency is 4224 MHz, and 2112 MHz obtained by ½ frequency division of the reference frequency is the sampling frequency of the nonlinear DA converter, the complex sine wave generating means outputs +264 MHz by incrementing +1 phase in a positive direction of phase in the complex plane, outputs −264 MHz by incrementing −1 phase in the positive direction of phase, outputs +792 MHz by incrementing +3 phases in the positive direction of phase, and outputs −792 by incrementing −3 phases in the positive direction of phase, and the frequency switching means obtains desired frequencies by performing the complex number multiplication of the reference frequency and the respective outputted frequencies of the complex sine wave generating means.

5. The frequency synthesizing apparatus according to claim 2, wherein the frequency switching means obtains 4488 MHz, 3960 MHz and 3432 MHz, which are respective center frequencies forming a group A of a multiband OFDM_UWB system, by performing complex number multiplication of the reference frequency and the respective outputted frequencies of the complex sine wave generating means.

6. The frequency synthesizing apparatus according to claim 5, wherein a frequency of 7128 MHz is further obtained in addition to 4224 MHz as a reference, and the frequency switching means further obtains 7920 MHz, 7392 MHz, 6864 MHz and 6336 MHz, which are respective center frequencies forming a group C of the multiband OFDM_UWB system, by selectively performing complex number multiplication of either reference frequency of 4224 MHz or 7128 MHz and the respective outputted frequencies of the complex sine wave generating means.

* * * * *